United States Patent [19]

Lambertus

[11] Patent Number: 4,597,870

[45] Date of Patent: Jul. 1, 1986

[54] FILTER DEVICE FOR A SCREW EXTRUDER

[75] Inventor: Friedrich Lambertus, Stuttgart, Fed. Rep. of Germany

[73] Assignee: Werner & Pfleiderer, Stuttgart, Fed. Rep. of Germany

[21] Appl. No.: 736,869

[22] Filed: May 22, 1985

[30] Foreign Application Priority Data

May 26, 1984 [DE] Fed. Rep. of Germany ....... 3419822

[51] Int. Cl.$^4$ ............................................ B01D 35/12
[52] U.S. Cl. .................................... 210/341; 210/417; 210/418; 210/432; 210/456; 425/198; 425/199
[58] Field of Search .................... 425/197, 198, 199; 210/456, 432, 341, 343, 340, 417, 418, 435, 424; 137/625.47; 251/297

[56] References Cited

U.S. PATENT DOCUMENTS 4,511,472 4/1985 Trott ................................. 425/197

*Primary Examiner*—Frank Sever
*Attorney, Agent, or Firm*—Roberts, Spiecens & Cohn

[57] ABSTRACT

A filter device for a screw extruder for the handling of molten plastic comprising a filter housing having inlet and outlet bores and a slide displaceable in the housing transverse to the direction of the flow of the melt. At least one recess in the slide forms a portion of a melt channel and receives a screen member. In order to obtain uniform distribution of the flow of melt in the filter device and of the pressure forces acting on the filter surface, the recess is formed by an annular milling which is surrounded by a replaceable cylindrical screen member. A flow passage in the slide extends from the melt channel to the outlet bore.

11 Claims, 5 Drawing Figures

FILTER DEVICE FOR A SCREW EXTRUDER

FIELD OF THE INVENTION

The present invention relates to a filter device for a screw extruder for molten plastic and particularly to a filter device which comprises a filter housing having a slide therein. The filter housing has an inlet for molten plastic and an outlet for filtered molten plastic and the slide has a recess with a screen member therein such that in an operative position of the slide, the screen member serves to filter the molten plastic in its flow from the inlet to the outlet.

DESCRIPTION OF PRIOR ART

In Federal Republic of Germany Provisional Patent AS No. 1554913 a filter device for a worm extruder is disclosed in which spaces for receiving screen members are formed by means of recesses in a slide, said screen members being replaceable one after the other in the melt flow during operation, depending on the degree of dirtying of the screen member.

In this device, the screen members are formed as flat circular screen disks which subjected to the pressure of the melt in the cross-sectional region of the inlet of the melt so that for screen members of large size not only must the slide be of relatively large size but the pressure forces act to an increased extent on the slide and its guidance in the filter housing.

Another disadvantage is that considerable amounts of waste result from the manufacture of circular screen members by stamping. In the processing of plastic wastes, which are known to contain a large amount of dirt, a large number of such screen members, however, are required, due to the need for the availability of a large filter surface. This results in considerable expense.

SUMMARY OF THE INVENTION

An object of the present invention is to provide a filter device of the aforementioned type which assures a uniform distribution of the molten plastic stream into the filter and of the pressure forces which act on the surface of the filter, as well as to permit complete relief of transverse forces acting on the guide surface of the slide.

The above and further objects of the invention are met by a construction wherein the annular recess in the outer periphery of the slide forms a portion of a melt channel which communicates with the inlet in the operative position of the slide, an annular screen member being mounted in said annular recess for filtering the molten plastic in its flow from the inlet to a passage in the slide which connects the inlet to the outlet in the operative position of the slide. The passage includes a portion which extends longitudinally in the direction of displacement of the slide and in the operative position of the slide said portion of the passage co-extends with the melt channel formed in part by the annular recess which receives the screen member.

By the special formation of the recess in the slide for the reception of the screen member there is obtained a flow of molten plastic which distributes itself widely over a relatively large filter surface. The recess which directly receives the screen member, permits a tight application of the filter cloth all around its cylindrical extent. A balanced loading by the pressure of the molten material with respect to the guide surface of the slide is obtained, so that deformations of the slide or formation of gaps within the guide bore for the slide are avoided.

An essential advantage of the construction according to the invention is the economical manufacture of the filter due to its simple geometrical shape. The screen cloth can be cut into rectangular shape corresponding to the dimensions of the annular recess and it can be wrapped around the cylindrical wall of the recess and removed just as easily after it has been dirtied.

According to another feature of the invention, an annular groove is formed in the housing which communicates with the annular recess in the slide to cooperate therewith to form the melt channel, the annular groove having a length at least as great as that of the recess. This permits rapid and complete filling of the melt channel around the screen member by positive displacement of the air enclosed in the melt channel after replacement of the screen cloth.

A rapid and uniform filling of the melt channel is furthermore obtained by another feature according to the invention, in which the melt channel is formed with a varying width over its annular extent and the width is a maximum in the region of the inlet.

The filter device has the advantage of convenient manufacture and easier mounting of the slide by the construction in which the recess in the slide is concentric therewith, whereas the annular groove in the housing is eccentric with the axis of the slide. Furthermore, an optimum flow of molten material through the screen member is obtained.

In accordance with another feature of the invention the annular recess in the slide is stepped to form first and second steps and the screen member comprises a relatively coarse distributor cloth secured on the first step and a relatively fine screen cloth removably mounted on the second step to surround the distributor cloth and cover the same. As a consequence, a tight application of the fine screen cloth onto the surface of the slide is obtained so that leakage flow caused by transverse flow in the distributor cloth is avoided.

In a particularly advantageous construction, a removable clamping means holds the screen cloth against the second step such that only the outer screen cloth which has become dirty need be replaced. Since the distributor cloth is fixed to the slide, the outer screen cloth can be easily separated and replaced, in which case a new screen cloth can be bonded on residues of melt in the distributor cloth. Instead of the distributor cloth, the annular recess can also be formed with a screw thread profile on its surface.

In accordance with a further feature of the invention, the passage in the slide which connects the inlet and outlet has a flow section which is equal to that of said inlet so that a substantial constant velocity of flow is obtained in the filter device.

In a further feature of the invention, a conical deflector is mounted in the slide which projects into the passage to form a flow section which widens in the direction of flow of the molten material so that the resistance to flow of the molten plastic in the slide is reduced to a minimum.

BRIEF DESCRIPTION OF THE DRAWING

Further features and advantages of the invention will be explained in further detail below with reference to illustrative embodiments which are shown in the drawing.

In the drawing.

DETAILED DESCRIPTION OF PREFERRED EMBODIMENTS

Figure 1:
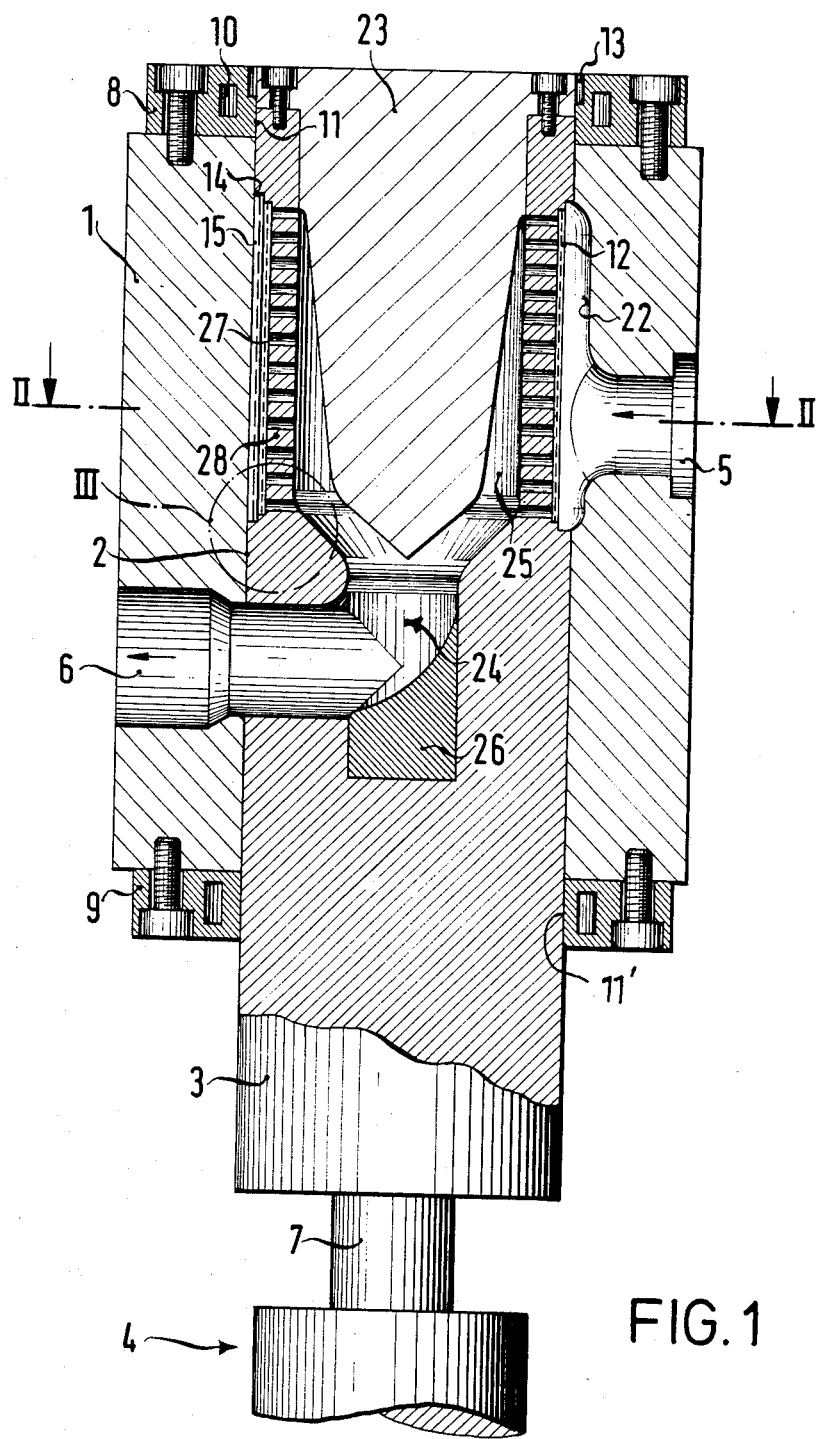
FIG. 1 is an elevational view, partly in section, of a filter device with slide which can be actuated by a piston-cylinder unit.
Figure 4:
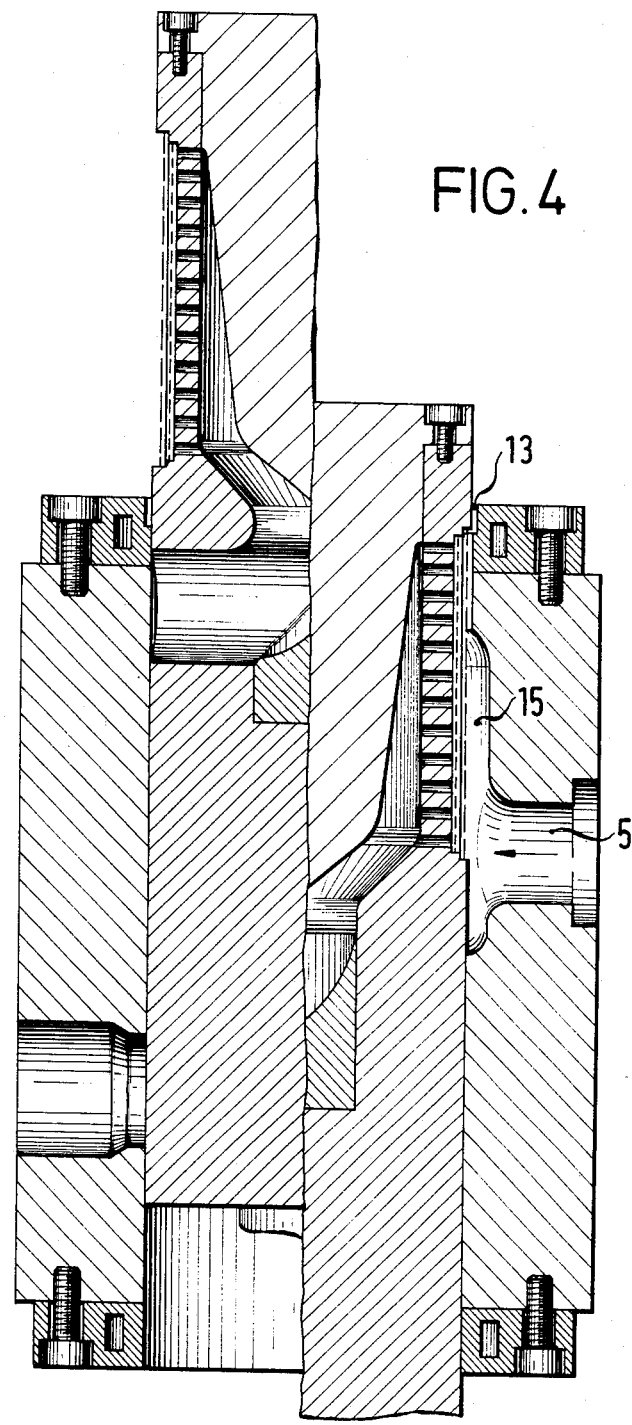
FIG. 4 shows the filter device of FIG. 1 in different positions of the slide.

FIG. 1 shows a filter device comprising a filter housing 1 having a bore within which a cylindrical slide member 3 is guidably supported for longitudinal sliding movement. The slide member 3 is movable to an operative position shown in FIG. 1 under the action of a piston rod 7 of a piston-cylinder unit 4. FIG. 4 shows the slide in a fully retracted position for screen replacement at the left and a partially inserted deaeration position at the right.

Within the filter housing 1 is a radial inlet 5 which is directly connectable to a screw extruder (not shown) for the supply of plastic melt into the filter device.

A radial outlet 6 serves for the discharge of filtered molten plastic. The outlet 6 is longitudinally offset from the inlet 5.

Flanges 8, 9 are secured to the filter housing 1 and have channels 10 for the flow of a cooling fluid for solidifying the melt in guide bores 11 and 11' of the respective flanges 8, 9. A recess 13 is formed in the flange 8 facing the outlet end of the slide member 3 to expose the melt, as will be explained later in further detail for a deaeration process.

The slide member 3 is provided at its periphery with an annular milled recess 14 which forms a circumferentially extending melt channel 15, in part.

Figure 3:
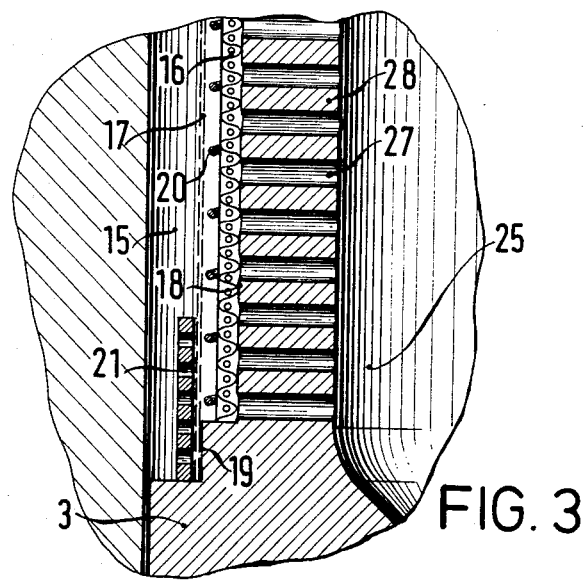
FIG. 3 shows, on enlarged scale, a detail X of the filter device of FIG. 1.

The annular recess 14 receives a screen member 12 comprising a relatively coarse distributor cloth 16 and a relatively fine screen cloth 17. For this purpose the recess is stepped as shown in detail in FIG. 3. As seen therein, two steps 18, 19 are formed, the distributor cloth 16 being embedded in first step 18 while the screen cloth 17 rests on second step 19 and covers the distributor cloth 16. The separate support of the screen cloth 17 facilitates its replacement when it is to be changed. Furthermore, cloth 17 has a snug fit in the region of the second step 19 which results in complete enclosure of the distributor cloth 16. Instead of the distributor cloth 16, a grid-like profile of slots can be formed in the cylindrical wall of the annular recess 14 in a simplified embodiment. Distributor cloth 16 and screen cloth 17 are of rectangular outline and are wound to surround the entire annular recess 14. The distributor cloth 16 is attached to the cylindrical wall of the recess 14 by a wrapped wire 20, whereas the screen cloth 17 is attached by means of a cylindrical clamping member 21 which is open at its periphery. The clamping member 21 may be formed, for instance, of hardened wire cloth or perforated spring-steel sheet and it can be pulled axially on and off the outer end of the slide member 3.

As shown in FIG. 1, an annular groove 22 in housing 1 is is in communication with the inlet 5 and extends the length of recess 14 to form melt channel 15 therewith.

The annular groove 22 is eccentrically arranged with respect to the longitudinal axis of the slide member 3 and extends the melt channel 15 so that it tapers in the circumferential direction, the channel 15 having its largest width or cross section in the vicinity of the inlet 5 to maximize the uniformity of distribution of the melt over the screen cloth 17.

The outlet 6 in the filter housing 1 is connected to the inlet 5 by a flow channel 24 in the slide 3. The diameter of channel 24 is such that its cross section corresponds to the entrance cross section of the inlet 5. A conical deflector 23 extends into the channel 24 to produce an annular collecting channel 25 which widens in the direction of flow of the melt and is deflected to the outlet 6. A filler member 26 is secured in the slide 3 and has a hydrodynamic shape to form a residue-free flow path for the molten plastic.

A plurality of passages 27 are formed in the slide in the region of the melt channel 15 and provide a connection between the melt channel 15 and the collecting channel 25. In order to limit the resistance to flow of the passages 27, the inside diameter of the slide of the collecting channel 25 is such that the remaining wall thickness which forms the support member 28 for the screen member 12 is sufficient to reliably resist the pressure of the melt. In this regard, the annular shape of the support member 28 favors its load-bearing capacity.

Replacement of the screen cloth 17 is effected after the slide 3 has been displaced to the outer retracted position shown in FIG. 4 by the piston-cylinder unit 4. This displacement takes place within a very short time period in order to limit outflow of melt through the bore 2.

By means of pliers, the clamping member 21, which bears with its own tension against the screen cloth 17, can be widened in diameter and axially removed from the screen cloth. After large adherent residues of the melt have been scraped off, the end of the wound screen cloth 17 is bent open and withdrawn from the distributor cloth 16. A new rectangular piece of screen cloth can now be rolled to cylindrical shape on the distributor cloth and the clamping member installed to secure the screen cloth in position.

During the return displacement of the slide 3 to the deaeration position shown at the right in FIG. 4, the melt, which is under pressure, forces its way via the inlet 5 into the melt channel 15, thereby displacing the air to the outside through the housing bore 2. Complete filling of the melt channel 15 is obtained by a brief stay of the slide 3 in the deaeration position. The slide is then displaced to the operative position shown in FIG. 1 when melt becomes visible in the recess 13.

Figure 2:
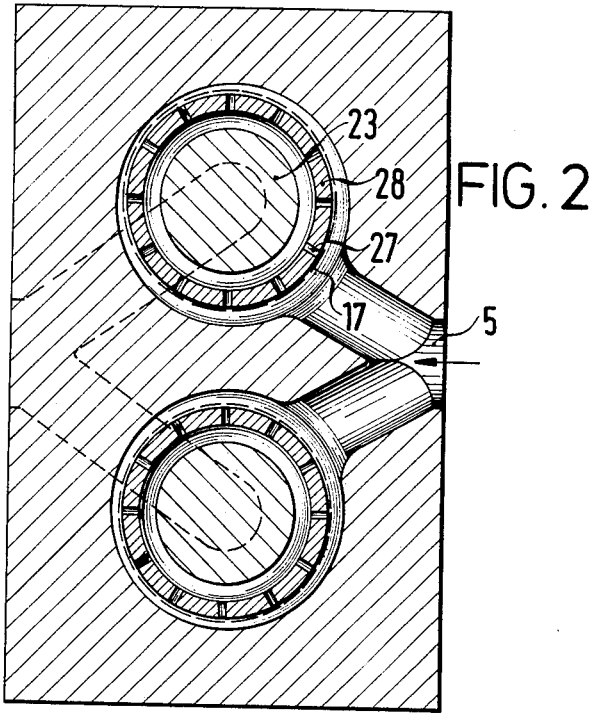
FIG. 2 is a sectional view taken on line II—II in FIG. 1.

If two slides 3 are provided in the filter housing 1 as shown in FIG. 2, the replacement of the screen cloth 17 takes place without interruption of the flow of the melt. Arrangements with three slides are also possible, in which case two filters can remain in use during the replacement of the screen cloth of one of the filters.

Figure 5:
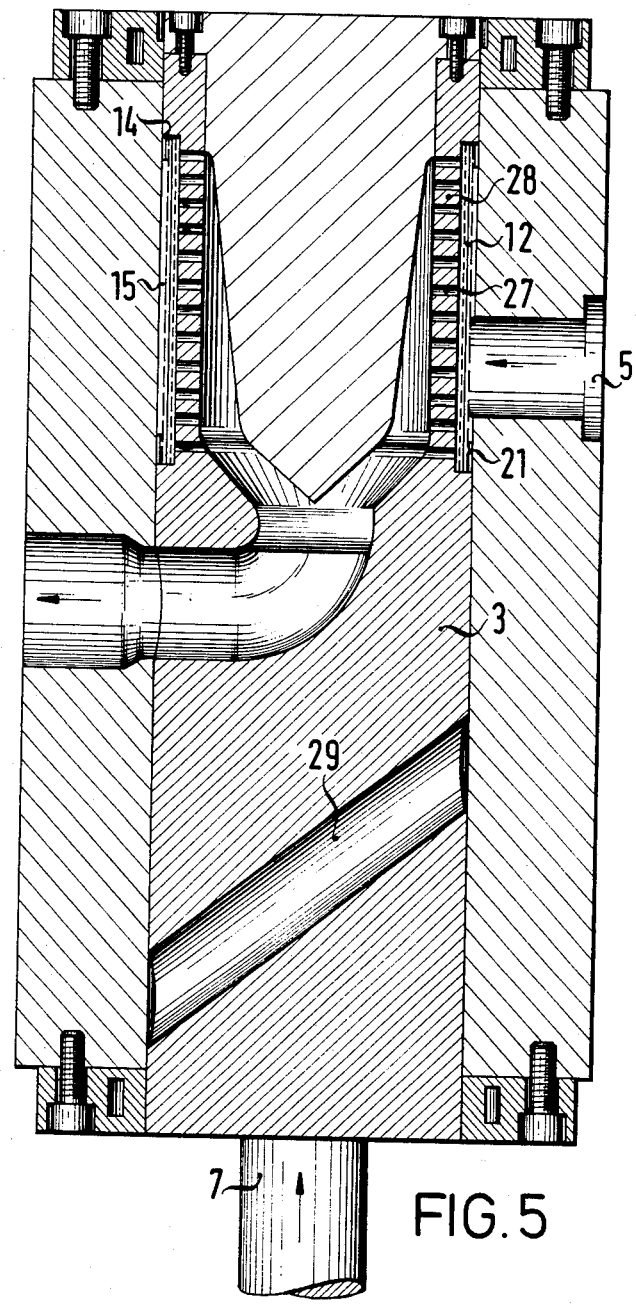
FIG. 5 shows a simplified embodiment of the filter device shown in operating position.

A relatively simple construction of the filter device which is sufficient for many tasks is shown in FIG. 5. Here, during the brief time of the replacement of the filter, the product is conducted unfiltered through a separate flow channel 29 in the slide 3. Furthermore, in this case the screen member 12 is formed cohesively of screen and distributor cloth and is clamped in the melt channel 15 by means of clamp members 21, so that the annular recess 14 is not stepped.

In this case also a balanced distribution of forces is obtained in the slide by the filter arrangement. Furthermore, a relatively large filter surface permits economical throughput rates. The filter material is of simple geometrical shape and can be easily produced without substantial waste. In the case of the separate arrangement of screen and distributor cloths, only slight expenses for filter material furthermore result due to the fact that only the screen cloth is to be replaced while the distributor cloth forms a fixed part of the slide. In this case, a dependable closing off of the distributor cloth is obtained in the manner that the screen cloth rests directly on the surface of the slide 3 in the region of its edges and leakage flow caused by transverse flows in the distributor cloth are avoided.

Although the invention has been described in relation to specific embodiments thereof, it will become apparent to those skilled in the art that numerous modifications and variations can be made within the scope and spirit of the invention as defined in the attached claims.

What is claimed is:

1. A filter device for a screw extruder for molten plastic comprising a filter housing having an inlet for molten plastic and an outlet for filtered molten plastic, a cylindrical slide supported for axial displacement in said housing, means for axially displacing said slide between operative and inoperative positions, said slide having a passage therein, and in said operative position, said passage connecting said inlet to said outlet for flow of molten plastic from said inlet to said outlet, said slide having an outer cylindrical periphery with an annular recess therein forming a portion of a melt channel communicating with said inlet in said operative position of the slide, and an annular screen member mounted in said annular recess for filtering molten plastic in its flow from said inlet to said passage, said passage having a portion which extends longitudinally in the direction of displacement of the slide and which in said operative position coextends with said melt channel, said housing having an annular groove communicating with said annular recess to cooperate therewith to form said melt channel, said annular groove having a length at least as great as that of said recess, said melt channel having a varying width over its annular extent, said width being a maximum in the region of said inlet.

2. A filter device as claimed in claim 1 wherein said annular recess is concentric with the axis of the slide while said annular groove is eccentric to said axis.

3. A filter device as claimed in claim 1 wherein said annular recess is stepped to form first and second steps, said screen member including a distributor cloth on the first step and a screen cloth on said second step surrounding said distributor cloth to cover the same.

4. A filter device as claimed in claim 3 wherein said screen cloth has edges which overlap the distributor cloth.

5. A filter device as claimed in claim 3 wherein said distributor cloth is fixed to said first step, the device further comprising means removably clamping said screen cloth against said second step.

6. A filter device as claimed in claim 5 wherein said clamping means comprises a resilient clamping member.

7. A filter device as claimed in claim 1 wherein said passage in said slide has a flow cross section equal to that of said inlet.

8. A filter device as claimed in claim 1 comprising a conical deflector in said slide projecting into said passage, said deflector narrowing conically in the direction of flow of the molten plastic such that said passage widens in the direction of flow.

9. A filter device as claimed in claim 1 wherein in said inoperative position the slide is retracted from said housing to expose said screen member, said slide having a further passage connecting said inlet and outlet when said slide is in said inoperative position.

10. A filter device as claimed in claim 1 wherein said inlet and outlet extend radially of the slide in axially offset relation and in said operative position are connected, through said screen member, by said passage in the slide.

11. A filter device as claimed in claim 1 wherein said means for displacing said slide comprises a piston-cylinder unit.

* * * * *